United States Patent [19]

Stevens

[11] Patent Number: 5,288,433
[45] Date of Patent: Feb. 22, 1994

[54] ELECTROCHROMIC DEVICE AND A METHOD TO MANUFACTURE THE SAME

[76] Inventor: Jim Stevens, Chalmers c/o Tekniska Högskola, Göteborg, Sweden, S-412 96

[21] Appl. No.: 603,674
[22] PCT Filed: Apr. 24, 1989
[86] PCT No.: PCT/SE89/00226
     § 371 Date: Dec. 3, 1990
     § 102(e) Date: Dec. 3, 1990
[87] PCT Pub. No.: WO89/10578
     PCT Pub. Date: Nov. 2, 1989

[30] Foreign Application Priority Data

Apr. 29, 1988 [SE] Sweden .................. 8801637-3

[51] Int. Cl.$^5$ .................. G02F 1/00; G02F 1/01
[52] U.S. Cl. .................. 252/583; 359/270; 359/274
[58] Field of Search .................. 252/583, 600, 586; 359/270, 274

[56] References Cited

U.S. PATENT DOCUMENTS

| | | | |
|---|---|---|---|
| Re. 33,040 | 8/1989 | Kakiuchi | 252/600 |
| 4,174,152 | 11/1979 | Giglia | 252/583 |
| 4,537,826 | 8/1985 | Miyamura et al. | 252/583 |
| 4,573,768 | 3/1986 | Polak et al. | 359/270 |
| 4,750,817 | 6/1988 | Sammells | 359/270 |
| 4,807,977 | 2/1989 | Sammells | 359/270 |
| 4,842,381 | 6/1989 | Green | 359/270 |
| 5,130,842 | 7/1992 | Gauthier et al. | 359/270 |

FOREIGN PATENT DOCUMENTS 64-54422 3/1989 Japan .
8910578 11/1989 PCT Int'l Appl. .

*Primary Examiner*—Philip Tucker
*Attorney, Agent, or Firm*—Lerner, David, Littenberg, Krumholz & Mentlik

[57] ABSTRACT

Electrochromic optical device and method to produce the same. The device includes first substrate (1) on the one side of the substrate a first transparent conductor (2) on the conductor a first electrochromic layer (3), a second substrate (4), on the one side of the second substrate a second transparent conductor (5), on the second transparent conductor, a second electrochromic layer (6), the two substrates are laminated to each other by means of a solid state polymer with their sides carrying the respective transparent conductor and electrochromic layer facing each other. The polymer work as an ion conductor and is based on methylacrylate and poly(-propyleneglycol) doped with a metal salt.

4 Claims, 2 Drawing Sheets

ELECTROCHROMIC DEVICE AND A METHOD TO MANUFACTURE THE SAME

BACKGROUND OF THE INVENTION

The invention relates to an electrochromic optical device and a method to manufacture the same. The invention may be used in optical devices such as windows, mirrors and high-contrast non-emissive display elements.

Electrochromism is known in oxides based on W, V, Ni, Mo, Ir, etc, and in numerous organic substances. Change in optical properties is caused by the injection or extraction of mobile ions. A material colouring, i.e. lowering its transparency, under injection or extraction is referred to, respectively, as cathodic or anodic material. Absorptance modulation as well as reflectance modulation are possible.

A practical coating in a device, for example having the form of a window, could comprise an electrochromic thin film integrated in an all-solid-state multilayer configuration.

It is known that one can form an optical device of this kind with two outer transparent conductors, required for applying the electric field, an electrochromic layer, an ion conductor in the following also mentioned as electrolyte, and an ion storage. This configuration is backed by a transparent substrate such as a glass pane; alternatively the configuration can be interposed between two transparent substrates. Coloration and bleaching are accomplished when ions are moved from the ion storage, via the ion conductor into the electrochromic layer or when the process is run in reverse. The ion storage can have the form of another electrochromic layer, preferably anodic if the base electrochromic layer is cathodic, or vice versa. By use of a purely ionic conductor, one can obtain an open circuit memory, i.e. the electric field has to be applied only when the optical properties are to be altered.

From French Patent No. 2 568 574 is known a solid state polymeric conductor usable in optical devices of the type described. As the polymer is suggested poly(ethylene glycol). It is also known that poly(propylene glycol) (PPG) also known as poly(propylene oxide) ... diol, doped with metal salts (e.g. lithium, sodium or potassium) are relatively good ionic conductors. It is also known that poly(ethylene oxide) (PEO) and its diol poly(ethylene glycol) (PEG) are even better ion conductors at temperatures greater than 60° C. Ratios of ether oxygen to metal in the range 9:1 to 25:1 produce the best conductivities in these series-some conductivities (for doped PPG) reaching as high as $5 \times 10^{-5}$ S cm$^{-1}$ at 25° C.

These prior known electrolytes are hygroscopic. In addition, doped PPG is fairly fluid in the range of good ionic conductivity, and doped PEO is crystalline below about 60° C. In a commercial product not only properties relating to the basic functions have to be considered, but also demands relating to the production and handling have to be fulfilled. A hygroscopic electrolyte will in practical use give a product with limited applicability or at least the necessity to build the device as a hermetically sealed casset. If, on the other hand, the electrolyte has a low solidity, i.e. it is fluid or gelatinous, or has a low adherence to pertinent surfaces it can not be integrated in the device as a carrying part of the same.

SUMMARY OF THE INVENTION

The object of the present invention is to obtain an electrochromic optical device with an electrolyte which is not hygroscopic and which has sufficient solidity that it could be integrated in the electrochromic device as a carrying part of the same, this ability being secured by the adherence of the electrolyte to the substrate of the device. The invention thus offers the possibility to form the device as a rigid laminate without the necessity of any framing or the like.

Another object is to adapt the active layers of the device to each other, including an electrolyte of the mentioned type, in order to form a device with a high functional quality.

These and other objects of the present invention are achieved by means of a co-polymer of a polyether (polypropyleneglycol-PPG) poly(methylmetacrylate) (PMMA) doped with a metal salt such as Lithium salt. PMMA provides in a loose network. The polymer has physical properties making it suitable as a lamination member of the device.

BRIEF DESCRIPTION OF THE DRAWINGS

On the accompanying drawings

DESCRIPTIONS OF THE PREFERRED EMBODIMENTS

Figure 1:
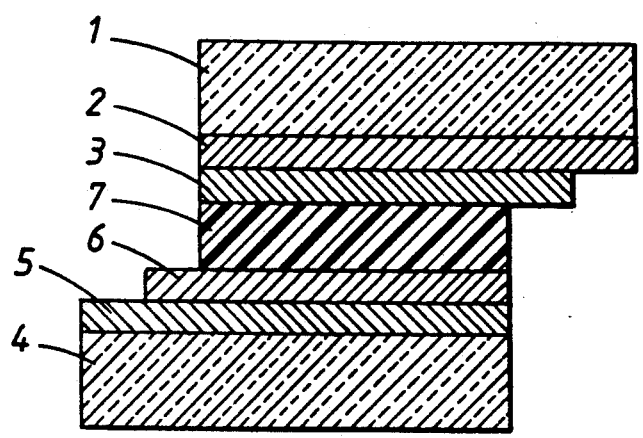
FIG. 1 is showing a crossection of an electrochromic device according to an embodiment of the invention.

A preferred embodiment of an electrochromic-based device according to the invention is illustrated in FIG. 1. The device is comprises a laminate and includes layers having the same functions as have been described before in the general description of the electrochromic optical devices. Accordingly a first layer is formed on a substrate and is then covered by the active layers of the device. This substrate has in FIG. 1 the reference numeral 1 and consists of a transparent glass pane; a suitable thickness would be 1 or a few mm. The substrate 1 is on its one side carrying a first transparent conductor 2. On its surface turned away from the substrate 1 the conductor is carrying a first electrochromic layer 3 of the device.

A second substrate 4, preferably a second glass pane of a similar thickness, is also on its one side carrying a transparent conductor 5, which in turn is carrying a second electrochromic layer 6 of another composition than the first electrochromic layer 3.

The layers are very thin: For example layer 2 could be 0.2 µm, layer 3 0.3 µm, layer 5 0.2 µm and layer 6 0.03 µm. These layers should be strongly adherent to the substrate or the underlying layer respectively. The two substrates 1 and 4, with their said layers, are joined together as shown in FIG. 1 with their coated sides facing each other. As joining member is used a co-polymer layer 7 forming the ion conductor of the device. This polymer layer preferable has a thickness of the order 0.1 mm.

Coloration and bleaching are accomplished by connecting the two conductors 2 and 5 by means of a suitable wiring to the poles of electrical source and applying a voltage of the order of 1 V for a suitable time. A reversible change of the optical properties is caused by reversing the polarity of the electrical source.

In the manufacturing of devices according to the preferred embodiments two pieces of 1 mm thick glass were each coated on one side with 0.2 μm thick electrically conducting indium tin oxide (ITO i.e. $In_2O_3$:Sn) layers forming the conductors 2 and 5. One of these was then overcoated with 0.3 μm of $WO_3$ on top of the conducting layer thus forming the first electrochromic layer 3. In one embodiment the other was overcoated with 0.03 μm of $NiO_x$ also on the conducting layer and forming the second electrochromic layer 6. In $NiO_x$ x is over or about 1 but lower or about 2 ($1 \leq x \leq 2$). In another embodiment the substrate 4 with its conductor 5 was overcoated with 0.1 μm of $V_2O_5$ thus forming the second electrochromic layer 6.

The substrate 1 with its layers 2 and 3 and the substrate 4 with its layers 5 and 6 were joined, with their coated sides facing each other, by means of the co-polymer layer 7 being a transparent polymeric electrolyte which served so as to glue the samples together. The co-polymer thus acts as a lamination material. In the lamination process, the co-polymer at approx. 90% polymerization is smeared onto the electrochromic layer 3. Substrate 4, with its layers 5 and 6, is then placed on the co-polymer with layer 6 making contact to the co-polymer. The assembly is then heated to between 50° and 60° C. to complete the polymerization in order to reach the solid state of the co-polymer.

Further coatings can be applied on those glass surfaces which are shown as being uncoated in FIG. 1, i.e. the outer sides of the device. These additional coatings could be used, for example, to diminish the thermal emittance, thereby improving the thermal insulation, when the device in FIG. 1 is integrated in a doubly or multiply glazed window.

For producing the first electrochromic layer 3 an electrochromic amorphous $WO_3$ film was prepared by reactive electron-beam evaporation. The thin film deposition unit was evacuated to $5 \cdot 10^{-5}$ Torr and was then backfilled with air to a pressure of 0.8 mTorr. Evaporation of 99.8% pure $WO_3$ granules was conducted onto the substrate 1, with its electrically conducting layer 2, positioned 30 cm above the hearth. The evaporation rate was kept constant at 1 nms$^{-1}$ via feedback control until a thickness of 0.3 μm was reached.

For producing the second electrochromic layer 6 according to one of the preferred embodiments, $NiO_x$ counterelectrode films were produced by reactive dc magnetron sputtering. The desposition system was evacuated to $2.5 \times 10^{-6}$ Torr and was then backfilled with oxygen to a pressure of 8 m Torr. Sputtering from a 99.5% pure nickel target, 10 cm in diameter, was conducted onto the substrate 4, with its electrically conducting layer 6, positioned 5 cm below the target. Presputtering was performed for 15 minutes before deposition begun. The power fed into the sputter plasma was 36 W, which gave a sputter rate equal to 2.5 nms$^{-1}$. Films with a thickness of 0.03 μm were produced.

For producing the second electrochromic layer 6 according to another preferred embodiment, $V_2O_5$ counterelectrode films were produced by reactive dc magnetrom sputtering. The deposition system was evacuated to $5 \times 10^{-6}$ Torr and was then backfilled with oxygen to a pressure of 12 mTorr. Sputtering from a 99.8% pure vanadium target, 10 cm in diameter, was conducted onto the substrate 4, with its electrically conducting layer 6, positioned 5 cm below the target. The power fed into the sputter plasma was 135 W which gave a sputter rate equal to about 0.1 nms$^{-1}$. Films with a thickness of 0.1 μm were produced. After removal av the substrate with its $V_2O_5$ coating from the deposition system, the coated substrate was immersed into an electrolyte consisting of 1 Molar lithium perchlorate and propanol carbonate. Lithium ions were introduced into the $V_2O_5$ layer by use of electrochemical treatment. A platinum foil served as counterelectrode during this process.

Now will be described two alternative processes to prepare the co-polymer forming the ion conductor of the layer 7.

Process I: PPG 4000—$LiClO_4$—methylmetacrylate (MMA):

1. MMA is dried for 12-24 hours under low vacuum ($\sim 10^{-2}$ Torr) by adding $Ca_2H_2$ and stirring. The monomer-powder mixture is then degassed to a pressure of $10^{-5}$ Torr and vacuum distilled into Pyrex ® tubes which are sealed on the vacuum line and taken to a dry laboratory with argon atmosphere.

2. PPG 4000 (polypropylene glycol) is filtered (1 μm Millipore-Teflon ® filter) and dried in a vacuum oven at 120° C. for 4-5 days. The material is transferred to the dry-laboratory with argon atmosphere.

3. Anhydrous $LiClO_4$ is opened as received (packed in argon by supplier) in the dry-laboratory argon atmosphere and stored under a low vacuum ($\sim 10^{-1}$ Torr) when not being used.

4. $LiClO_4$ salt, in the weight range of 0.300-0.320 mg, is prepared in a small beaker with stirrer. The tube of MMA prepared in (1) above is opened under argon and 0.3 to 0.4 mg is added to the $LiClO_4$ and stirred on a hot plate at 50°-60° C. When the $LiClO_4$ is dissolved or nearly dissolved, PPG 4000 is added in the weight range of 1.6 to 1.7 mg and stirred at 50°-60° C. until a clear, homogeneous solution is obtained. 5. The solution is heated under argon at 50° C. and the MMA is allowed to polymerize, or co-polymerize, with the PPG ($LiClO_4$ is a good catalyst) until one can draw a long string of sticky substance from the surface. Some MMA has evaporated. In this state the co-polymer has reached about 90% polymerization and can now be coated onto the substrate and thereafter cured to its fully solid state.

It can also be stored in its partly polymerized state for some time by allowing the mixture to stand at room temperature for one week under argon. At the end of this time any remaining MMA is pumped off in a vacuum oven.

About 5% or less, by weight MMA to PPG remains in the final product, which is a transparent, conducting, adhesive, solid elastomer.

Conductivities between $5 \times 10^{-6}$ and $5 \times 10^{-5}$ S cm$^{-1}$ have been measured at room temperature, depending on the network obtained.

Process II: Silwet 77—$LiClO_4$—MMA (methylmetacrylate):

"Silwet" is a trade name of Union Carbide. It is a polyalkane oxide modified dimethylpoly(siloxane). Silwet 77 is a particular low-viscosity product with 25% EO units by weight.

1. The same procedure as for 1, 2, 3 in I above are followed, except that the Silwet 77 is dried at 80° C. in a vacuum oven. (It degreades at 120° C.).

2. $LiClO_4$ salt, in the weight range 0.300-0.500 mg, is prepared in a small beaker with stirrer. 0.3 to 0.4 mg MMA is added to the $LiClO_4$, and the mixture is stirred on a hot plate at 50°–60° C. until the LiClO$_4$ is dissolved or nearly so. Silwet 77 in the weight range 1.6 to 1.7 mg is added and stirred at 50° until a clear homogeneous solution is obtained.

3. The solution is stirred at room temperature under argon for 2 days and then allowed to stand for 2–3 weeks under argon until the loose-sticky network mentioned is formed.

The same properties as in I ar found, but with better conductivities (all in the $10^{-5}$ S cm$^{-1}$ range at room temperature).

In the descriptions of process I and II LiC10$_4$ has been mentioned as the metal salt with which the copolymer is doped. However, also other metal salts are usable for doping of the polymer. Suitable such salts are NaCF$_3$SO$_3$, LiCF$_3$SO$_3$, LiSCN and NaSCN.

The different components of the electrochromic-based window coatings will now be discussed. The electrochromic layer used in both of the preferred embodiments is amorphous WO$_3$ which displays absoptance modulation and can yield a variation of the transmitance between wide limits. Crystalline WO$_3$, which can be produced by deposition onto substrates heated to a high temperature, allows a fair degree of reflectance modulation. Electrochromic WO$_3$ shows best durability when operated in conjuction with aprotic electrolytes, preferrably containing Li$^+$ ions. Fine-crystalline NiO$_x$ is a relatively newly discovered electrochromic material permitting absorptance modulation. Its durability seems to be better than for WO$_3$. V$_2$O$_5$, finally, is a known electrochromic material.

A particularly interesting design of the device, which is an embodiment of the present invention, is to combine one anodic and one cathodic electrochromic material via the transparent polymeric ion conductor which also serves as a lamination material. The transparent conductors, finally, is in this embodiment of the heavily doped oxide semiconductor described. Electrochromic multilayer coatings can be backed by reflecting surfaces so that variable-reflectance devices are accomplished.

A solid transparent adhesive polymeric ion conductor is a crucial material for a successful large-scale electrochromics-based device. This crucial material is developed with a new approach and can be produced as has been described. A loose network of poly(methylmethacrylate) (PMMA)—normally a substance of high glass transition temperature ($\sim 105°$ C.)—is accordingly used as a base material into which units of doped ethylene oxide (EO) or doped poly(propylene glycol) (PPG) or doped Silwet are integrated. Basically the monomer (methyl methacrylate) (MMA) is used as a solvent, or partial solvent, for a metal salt, and the solution, or solution plus undisolved salt, is mixed with the appropriate amount of PPG or Silwet. The substance is heated and stirred in an argon atmosphere until complete dissolution of the metal salt takes place. The MMA in the mixture is then allowed to polymerize, or co-polymerize, to form a loose network. Some MMA evaporates so that the final product contains about 10%, or less, MMA to PPG or Silwet by weight. The final product is a sticky, transparent, adhesive solid elastomer with ionic conducting properties as good as, or better than, those of the corresponding pure doped PPG or doped Silwet. Further, the ability of the pure doped PPG, or doped Silwet, to pick up and incorporate water is severly restricted by the network. In the PPG (molecular wight 4000)—LiClO$_4$—MMA system, about 10:1 to 20:1 O:Li gives the best results. For the Silwet 77—LiClO$_4$—MMA system about 2:1 to 5:1 O:Li gives the best results.

It is possible to substitute LiClO$_4$ with some other metal salts as has been mentioned before. The indication of a certain metal salt for doping do not exclude that also two or more kinds salt can be present in the polymer.

SOME SPECTRAL DATA FOR DEVICES

Figure 2:
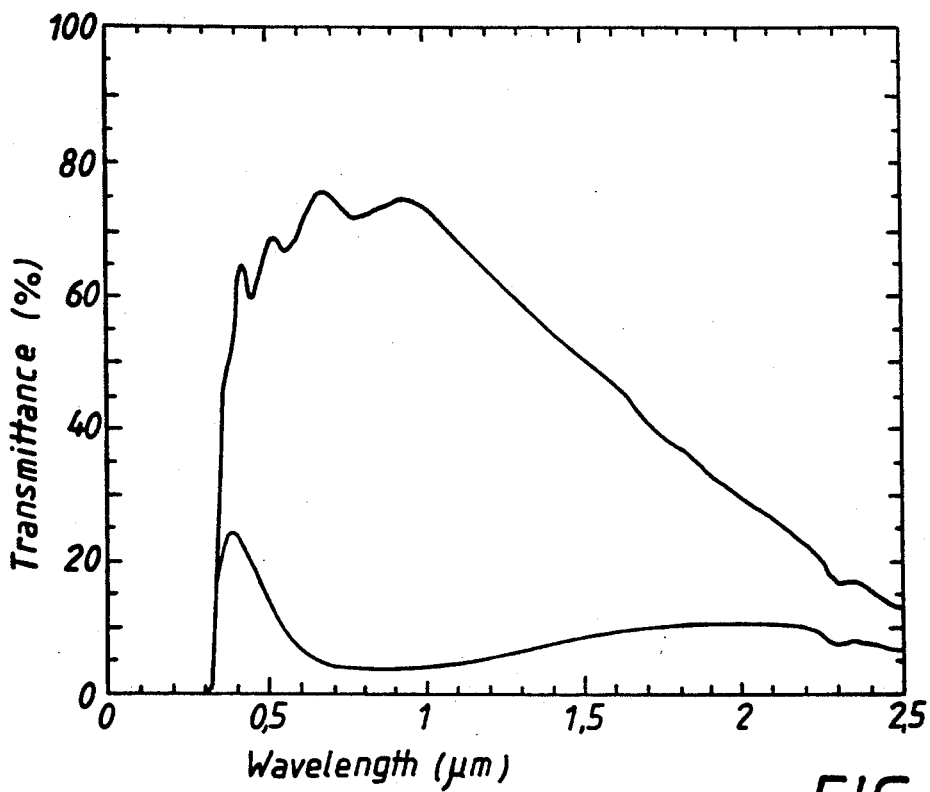
FIGS. 2 and 3 are showing the spectral transmittance of two devices manufactured according to the invention.
Figure 3:
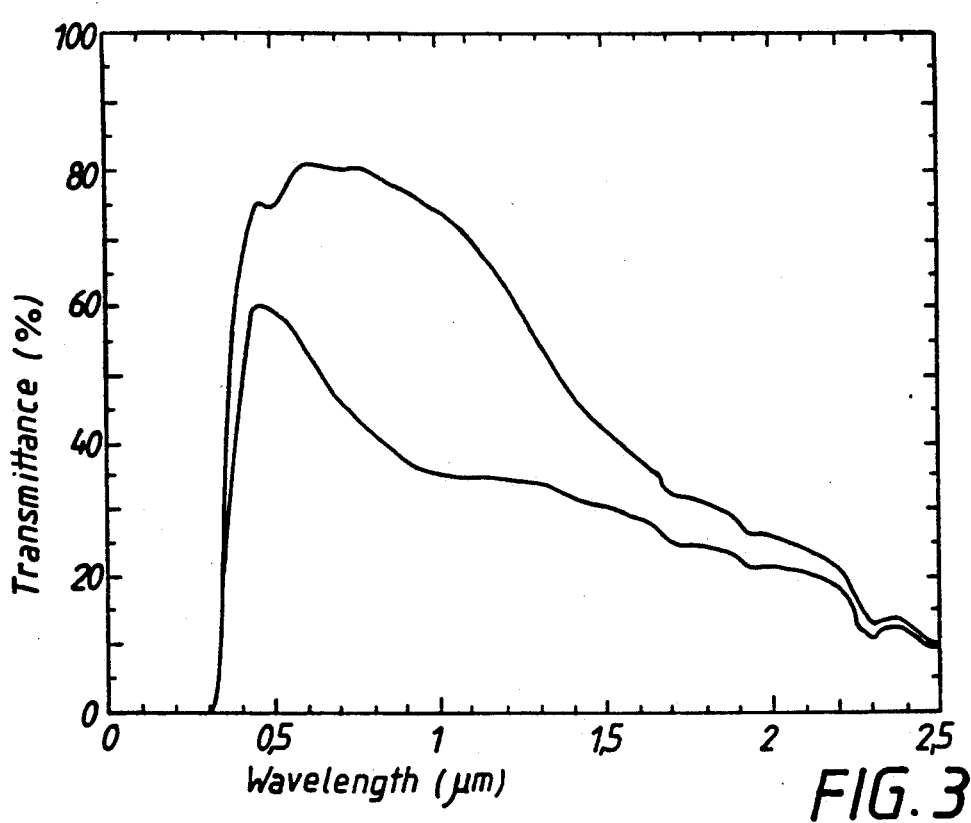

FIGS. 2 and 3 show spectral transmittance, in the wavelength interval pertinent to solar irradiation, for devices of the kind shown in FIG. 1 and with materials prepared as outlined above. FIG. 2 refers to an embodiment with a counterelectrode of NiO$_x$ and FIG. 3 to an embodiment with a counterelectrode of V$_2$O$_5$. The data were taken at normal incidence in a double-beam spectrophotometer, with the devices mounted in the sample beam and the reference beam left free. The large range of optical modulation that can be accomplished is apparent from the figures.

I claim:

1. An electrochromic optical device comprising a first substrate, a first transparent conductor on one side of said first substrate, a first electrochromic layer on the side of said first transparent conductor opposite said first substrate, a second substrate, a second transparent conductor on one side of said second substrate, a second electrochromic layer on the side of said second transparent conductor opposite said second substrate, the two substrates with their respective sides carrying the respective transparent conductors and electrochromic layers facing each other and being laminated to each other by means of a solid state polymeric material doped with a metal salt said metal salt being selected from the group consisting of LiClO$_4$, NaCF$_3$SO$_3$, LiCF$_3$SO$_3$, LiSCN and NaSCN, said metal salt being capable of working as an ion conductor, wherein the ion conductor comprises a poly(methylmethacrylate) and a polyether.

2. The device according to the claim 1 wherein, the electrochromic layer includes an anodic electrochromic material and the second electrochromic layer includes a cathodic electrochromic material.

3. The device according to claim 2, wherein the first electrochromic layer includes WO$_3$ and the second electrochromic layer includes NiO$_x$ with $1 < X < 2$.

4. The device according to claim 2, wherein the first electrochromic layer includes WO$_3$ and the second electrochromic layer includes V$_2$O$_5$.

* * * * *

UNITED STATES PATENT AND TRADEMARK OFFICE
CERTIFICATE OF CORRECTION

PATENT NO. : 5,288,433
DATED : February 22, 1994
INVENTOR(S) : Stevens

It is certified that error appears in the above-identified patent and that said Letters Patent is hereby corrected as shown below:

Column 2, line 38, after "device", delete the word "is".
Column 3, line 57, after the word "deposition", insert the word --was--.
Column 3, line 64, "magnetrom" should read --magnetron--.
Column 4, line 31, between the words "LiClO$_4$" and "salt", insert a space.
Column 4, line 38, between the word "obtained." and the numeral "5.", begin a new paragraph.
Column 4, line 65, "degreades" should read --degrades--.
Column 5, line 9, "ar" should read --are--.
Column 5, line 12, "LiCl0$_4$" should read --LiClO$_4$--.
Column 5, line 37, "is" should read --are--.
Column 6, line 15, after the word "kinds", insert the word --of--.

Signed and Sealed this

Sixth Day of September, 1994

BRUCE LEHMAN

Attest:

*Attesting Officer*    *Commissioner of Patents and Trademarks*